US012644957B2

(12) United States Patent
Owen et al.

(10) Patent No.: US 12,644,957 B2
(45) Date of Patent: Jun. 2, 2026

(54) SYSTEM AND METHOD FOR MODEL-BASED RADAR SIGNAL DEINTERLEAVING USING POLYSWEEP TECHNIQUE

(71) Applicant: The United States of America, as Represented by the Secretary of the Navy, San Diego, CA (US)

(72) Inventors: Mark William Owen, San Diego, CA (US); Barry R. Hunt, San Diego, CA (US); Bieu Van Lu, San Diego, CA (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 352 days.

(21) Appl. No.: 18/518,160

(22) Filed: Nov. 22, 2023

(65) Prior Publication Data

US 2025/0138138 A1 May 1, 2025

Related U.S. Application Data

(60) Provisional application No. 63/594,498, filed on Oct. 31, 2023.

(51) Int. Cl.
*G01S 7/02* (2006.01)
*G01S 7/292* (2006.01)

(52) U.S. Cl.
CPC ............ *G01S 7/021* (2013.01); *G01S 7/2923* (2013.01)

(58) Field of Classification Search
CPC .......... G01S 7/021; G01S 7/2923; G01S 7/41; H04B 1/7163; G01R 23/15
See application file for complete search history.

(56) References Cited

U.S. PATENT DOCUMENTS 4,721,958 A * 1/1988 Jenkin ..................... G01S 7/021
342/13
4,918,455 A * 4/1990 Maier ..................... G01S 7/021
342/13
(Continued)

FOREIGN PATENT DOCUMENTS

CN 108562875 A * 9/2018 ............... G01S 7/38

OTHER PUBLICATIONS

108562875-Desc-en.pdf, machine translation of CN-108562875-A (Year: 2018).*

(Continued)

*Primary Examiner* — William Kelleher
*Assistant Examiner* — Kenneth W Good
(74) *Attorney, Agent, or Firm* — Naval Information Warfare Center, Pacific; Kyle Eppele; Paul C. Oestreich

(57) ABSTRACT

Radar intercept hardware is capable of receiving and storing multiple radar signals in any context including air, land, sea or space domains as radar pulse data. However, without a priori knowledge of all of the radar emitters captured by such radar interceptors, the information or intelligence that has been gathered is of little use until such radar signals are separated or deinterleaved from the radar pulse data. The present invention is directed to model-based radar signal deinterleaver systems and methods. The characteristics of known radar models, particularly pulse repetition intervals, pulse width, time of arrival and radio frequency are used by the various embodiments of the system and method of the present invention to extract out the known signals and leave the unknown or residue signals for adjudication by a subject matter expert.

17 Claims, 10 Drawing Sheets

(56) References Cited

U.S. PATENT DOCUMENTS

| | | | | | |
|---|---|---|---|---|---|
| 5,563,806 | A | * | 10/1996 | Barry | G01S 7/021 |
| | | | | | 702/190 |
| 7,397,415 | B1 | * | 7/2008 | Wang | G01S 7/021 |
| | | | | | 342/40 |
| 10,571,556 | B2 | | 2/2020 | Fleizach et al. | |
| 2011/0058535 | A1 | * | 3/2011 | Djahanshahi | G01S 7/021 |
| | | | | | 370/338 |
| 2024/0320558 | A1 | * | 9/2024 | McCarthy | G06N 20/00 |

OTHER PUBLICATIONS

Mohammad Aldossary, "De-interleaving of Radar Pulses for EW Receivers with an ELINT Application", MSEE Dissertation, University of Cape Town, Mar. 2017.

Chunjie et al., "Synthetic algorithm for deinterleaving radar signals in a complex environment", IET Radar, Sonar & Navigation, vol. 14, Iss. 12, pp. 1918-1928, 2020.

Dadgarnia et al., "A Novel Method of Deinterleaving Radar Pulse Sequences Based on a Modified DBSCAN Algorithm", China Communications, vol. 20, No. 2, pp. 198-215, 2023.

Ge et al., "Improved Algorithm of Radar Pulse Repetition Interval Deinterleaving Based on Pulse Correlation", IEEE Access, vol. 7, pp. 30126-30134, Mar. 20, 2019.

Hasani et al., Pulse deinterleaving based on fusing PDWs and PRI extraction process for radar-assisted edge devices considering computational costs, JWCM, 2021:98, 2021.

Keshevarzi et al., "A Simple Geometrical Approach for Deinterleaving Radar Pulse Trains", 2016 UKSim-AMSS 18th Annual Intl Conf. on Computer Mod. and Sim., pp. 172-177, 2016.

Yuan Li, Jessica Lin and Tim Oates, "Visualizing Variable-Length Time Series Motifs".

Liu et al., "Improved method for deinterleaving radar signals and estimating PRI values", IET Radar, Sonar & Navigation, vol. 12, Issue 5, pp. 506-514, 2018.

Mottier et al., "Deinterleaving and Clustering unknown Radar pulses", 2021 IEEE Radar Conference (RadarConf21) 978-1-7281-7609-2/20, 2021.

Senin et al., "GramarViz 2.0: a tool for grammar-based pattern discovery in time series".

Senin et al., "Time series anomaly discovery with grammar-based compression", 18th International Conference on Extending Database Technology (EDBT), Mar. 23-27, 2015.

Wiley, "Elint: The Interception and Analysis of Radar Signals", Chapter 12, Pulse Repetition Interval Analysis, Artech House, pp. 281-315, 2006.

Wiley, "Elint: The Interception and Analysis of Radar Signals", Chapter 13, Deinterleaving Pulse Trains, Artech House, pp. 317-334, 2006.

* cited by examiner

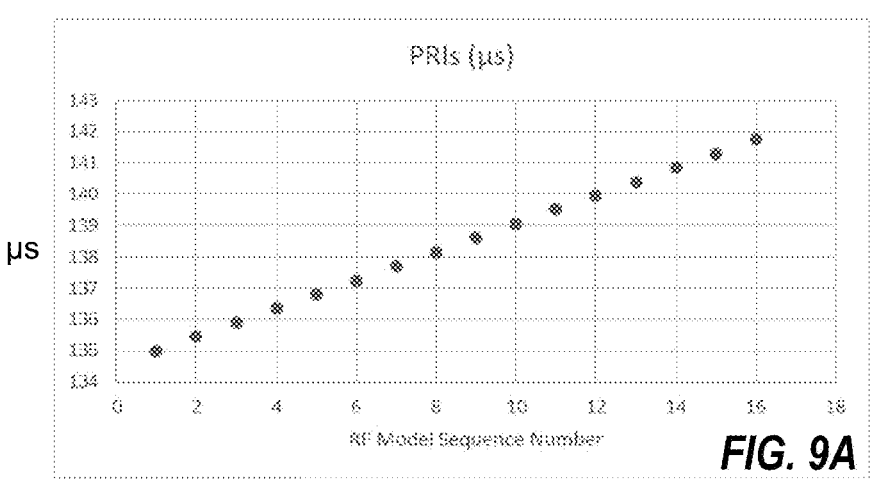
FIG. 9A
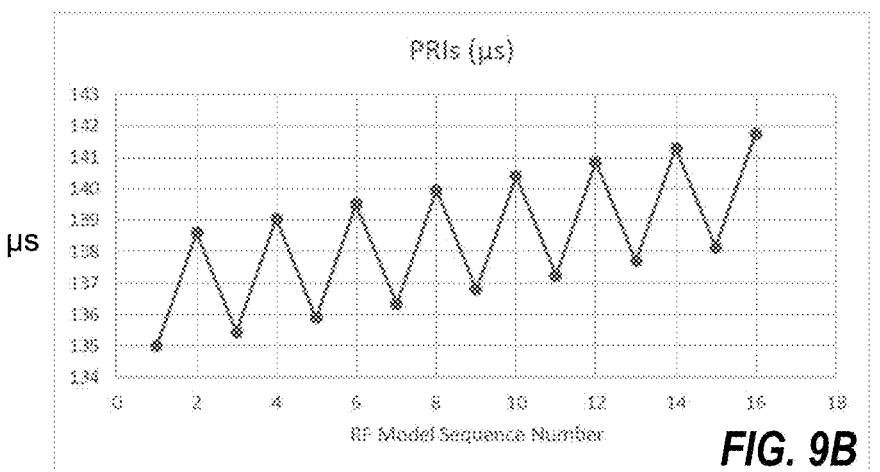
FIG. 9B
| Clock (µs) | COUNTDOWNS | PATTERN | PRIs (µs) | PRIs (µs) pattern |
|---|---|---|---|---|
| 0.45 | 300 | 1 | 135.00 | 135.00 |
| | 301 | 9 | 135.45 | 138.60 |
| | 302 | 2 | 135.90 | 135.45 |
| | 303 | 10 | 136.35 | 139.05 |
| | 304 | 3 | 136.80 | 135.90 |
| | 305 | 11 | 137.25 | 139.50 |
| | 306 | 4 | 137.70 | 136.35 |
| | 307 | 12 | 138.15 | 139.95 |
| | 308 | 5 | 138.60 | 136.80 |
| | 309 | 13 | 139.05 | 140.40 |
| | 310 | 6 | 139.50 | 137.25 |
| | 311 | 14 | 139.95 | 140.85 |
| | 312 | 7 | 140.40 | 137.70 |
| | 313 | 15 | 140.85 | 141.30 |
| | 314 | 8 | 141.30 | 138.15 |
| | 315 | 16 | 141.75 | 141.75 |
FIG. 9C

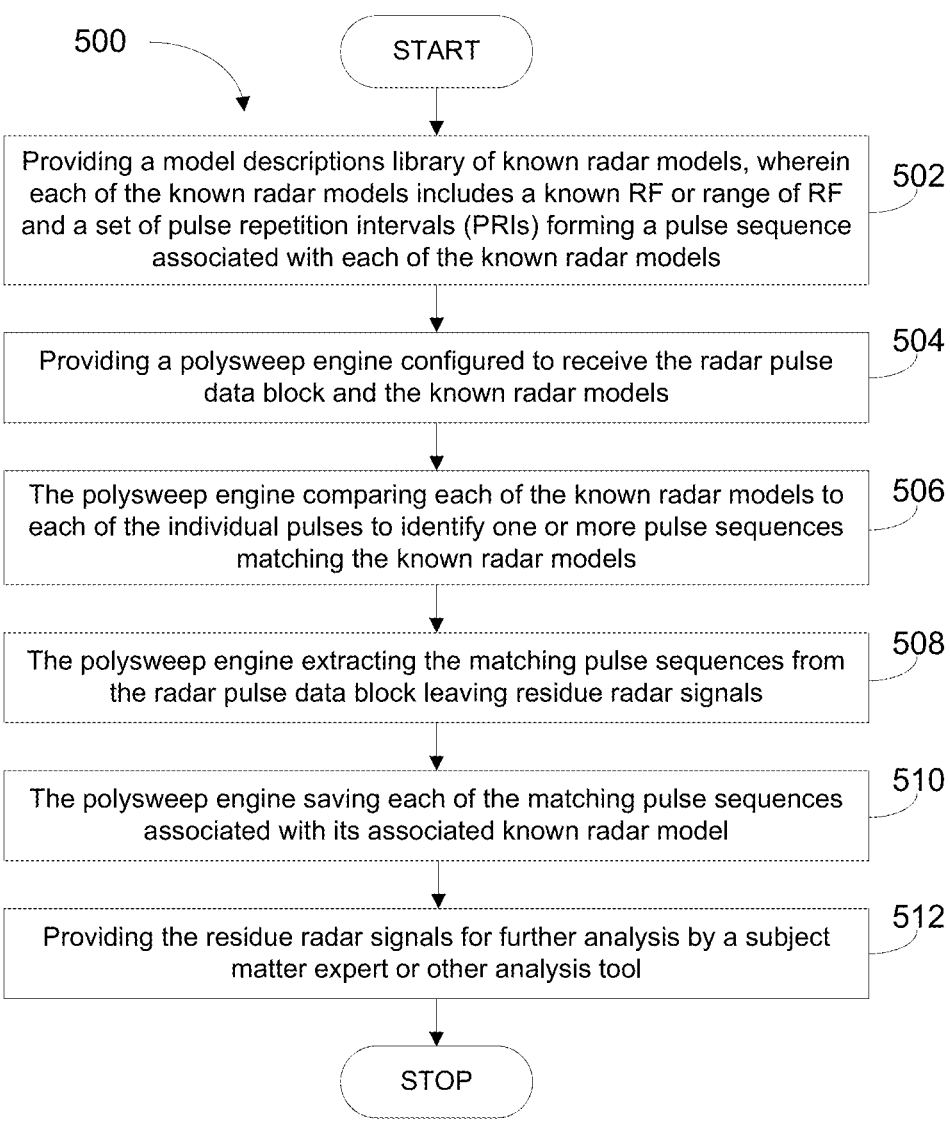

500

START

Providing a model descriptions library of known radar models, wherein each of the known radar models includes a known RF or range of RF and a set of pulse repetition intervals (PRIs) forming a pulse sequence associated with each of the known radar models — 502

Providing a polysweep engine configured to receive the radar pulse data block and the known radar models — 504

The polysweep engine comparing each of the known radar models to each of the individual pulses to identify one or more pulse sequences matching the known radar models — 506

The polysweep engine extracting the matching pulse sequences from the radar pulse data block leaving residue radar signals — 508

The polysweep engine saving each of the matching pulse sequences associated with its associated known radar model — 510

Providing the residue radar signals for further analysis by a subject matter expert or other analysis tool — 512

STOP

FIG. 10

SYSTEM AND METHOD FOR MODEL-BASED RADAR SIGNAL DEINTERLEAVING USING POLYSWEEP TECHNIQUE

CROSS-REFERENCE TO RELATED APPLICATIONS

This US Nonprovisional Patent Application claims benefit and priority to U.S. Provisional Patent Application No. 63/594,498, filed Oct. 31, 2023, titled: "SYSTEM AND METHOD FOR MODEL-BASED RADAR SIGNAL DEINTERLEAVING USING POLYSWEEP TECH-NIQUE". This US Nonprovisional Patent Application is related to U.S. patent application Ser. No. 17/866,601, filed Jul. 18, 2022, titled: "RADIO FREQUENCY SIGNAL RECEIVER/IDENTIFIER LEVERAGING UNUSED PULSES", now U.S. Pat. No. 12,265,168 B2, issued: Apr. 1, 2025. Navy Case Number 112642. The contents of the above-referenced patent applications are hereby incorporated by reference for all purposes as if fully set forth herein.

FEDERALLY-SPONSORED RESEARCH AND DEVELOPMENT

The United States Government has ownership rights in this invention. Licensing and technical inquiries may be directed to the Office of Research and Technical Applications, Naval Information Warfare Center Pacific, Code 72120, San Diego, CA, 92152; voice: (619) 553-5118; email: NIWC_Pacific_T2@navy.mil. Reference Navy Case Number 211135.

BACKGROUND OF THE INVENTION

Field of the Invention: The present invention relates generally to any pulsed signal, e.g., radio frequency (RF), acoustic, optical, etc., that can be modeled as a set of defined intervals between pulses. More particularly, embodiments of the present invention find application in electronic intelligence gathering through radar receivers. Still more particularly, the present invention relates to systems and methods of deinterleaving multiple radar signals to determine known and unknown signal sources.

Description of Related Art: Radar signals have become more complex with advances in hardware and digital signal processing systems. The ability to sense and obtain valuable information from remotely transmitted radar signals that guide aircraft or missiles to targets is particularly useful in hostile situations. The interception and analysis of radar signals plays a critical role in maintaining defensive capabilities and formulating tactical and strategic responses to threats. Obtaining valuable electronic intelligence involves antennas, receivers, strategies for searching radar signal information, measuring signal parameters, recording and reporting of signal interceptions for more detailed analysis.

The radar signal data gathered may be focused on hostile defense networks, such as radars, surface-to-air missile (SAM) systems and aircraft. Such data may be gathered from ground stations near the hostile territory, from ships or aircraft nearby and even from satellites in space. Use of the electronic intelligence gathered from such intercepted radar signals may be used in planning to avoid heavily defended areas, making use of flight profiles which give a penetrator the best chance of avoiding hostile fire and enabling intelligent jamming of hostile defense networks. Knowledge of the whereabouts of enemy ships, command and control centers, SAM systems and other enemy assets permits them to be attacked if need be.

There are many challenges in analyzing electronic intelligence embedded in radar signals including noise limitations, unknown direction of arrival and carrier frequency, multiple radar signals interleaved and the ability of a radar signal analyst to infer radar capabilities with increasingly complex radar systems. Raw measurement of RF signal data may include multiple RF emitters with signals interleaved. It is often desirable to identify individual RF emitters based on the RF signals they emit.

In view of the foregoing and for other reasons that will become evident, there exists a need in the art for improved systems and methods for deinterleaving radar pulse data and identifying known and unknown radar signals.

SUMMARY OF THE INVENTION

An embodiment of a method of deinterleaving pulse sequences in a radar pulse data block of intermingled radar signals measured by an intercept receiver is disclosed. Each individual pulse in the radar pulse data block may be defined by a pulse descriptor word (PDW), each PDW having at minimum, a pulse time of arrival (TOA) a pulse width (PW) and a radio frequency (RF). The embodiment of the method may include providing a model descriptions library of known radar models, wherein each of the known radar models includes a known RF or range of RF and a set of pulse repetition intervals (PRIs) forming a pulse sequence associated with each of the known radar models. The embodiment of the method may further include providing a polysweep engine configured to receive the radar pulse data block and the known radar models. The embodiment of the method may further include the polysweep engine comparing each of the known radar models to each of the individual pulses to identify one or more pulse sequences matching the known radar models. The embodiment of the method may further include the polysweep engine extracting the matching pulse sequences or matching pulse groups from the radar pulse data block leaving residue radar signals. The embodiment of the method may further include the polysweep engine saving each of the matching pulse sequences associated with its associated known radar model. The embodiment of the method may further include providing the residue radar signals for further analysis by a subject matter expert or other analysis tool.

A system for deinterleaving pulse sequences in a radar pulse data block of intermingled radar signals measured by an intercept antenna and receiver is disclosed. Each individual pulse in the radar pulse data block may be defined by a pulse descriptor word (PDW), each PDW having at a minimum, a pulse time of arrival (TOA), a pulse width (PW) and a radio frequency (RF). The embodiment of the system may include the intercept antenna and receiver receiving the radar pulse data block comprising an interleaved train of intermingled radar pulse signals. The embodiment of the system may further include computer storage for storing the radar pulse data block. The embodiment of the system may further include a model descriptions library configured with known all domain radar models, wherein each of the known radar models includes a known RF and a set of PRIs forming a pulse sequence associated with each of the known radar models. The embodiment of the system may further include the deinterleaving system configured to receive the radar pulse data block from the computer storage and each of the radar models from the model descriptions library. The deinterleaving system may further include a polysweep engine including at least one processor, a memory configured for storing data and a computer program, the computer program including machine-readable computer instructions for performing a method of deinterleaving pulse sequences. The deinterleaving system may further include the polysweep engine further configured to output one or more matching pulse sequences deinterleaved from the radar pulse data block and any remaining residue or unmatched radar pulses from the radar pulse data block.

Another method of deinterleaving pulse sequences in a radar pulse data block of intermingled radar signals measured by an intercept antenna and receiver is disclosed. Each individual pulse in the radar pulse data block may be defined by a pulse descriptor word (PDW), each PDW having at a minimum, a pulse time of arrival (TOA), a pulse width (PW) and a radio frequency (RF), according to this method. The embodiment of the method may include providing a model descriptions library configured with known radar models(1 . . . n), wherein each of the known radar models(1 . . . n) includes a known RF and a set of PRIs forming a pulse sequence associated with each of the known radar models. The embodiment of the method may further include setting current model to known radar model(1) of the n known radar models. The embodiment of the method may further include comparing the current model to each of the individual pulses to identify a pulse sequence matching the current model. The embodiment of the method may further include for each serially matched PDW removing and outputting a matching pulse sequence associated with current model and leaving residue radar signals and returning to the comparing step with the residue radar signals beginning with next PDW not output in prior step. If no further PDWs in the unmatched residue radar signals match the current model and if current model is not model (n), incrementing the current model and repeat the above steps beginning with the comparing step above using the residue radar signals and beginning with first remaining residue radar signal, otherwise continue with next step. The embodiment of the method may further include outputting residual radar pulses for analysis by a subject matter expert.

BRIEF DESCRIPTION OF THE DRAWINGS

The following drawings illustrate exemplary embodiments for carrying out the invention. Like reference numerals refer to like parts in different views or embodiments of the present invention in the drawings.

FIGS. 9A-9B are graphs illustrating PRI versus sequence number for exemplary linear and stagger radar model PRI sequences, respectively.

FIG. 9C illustrates a summary of the data from the graphs shown in FIGS. 9A and 9B in tabular form.

FIG. 10 is a flowchart of an embodiment of a method of deinterleaving pulse sequences in a radar pulse data block of intermingled radar signals measured by an intercept receiver, according to the present invention.

DETAILED DESCRIPTION

Figure 1:
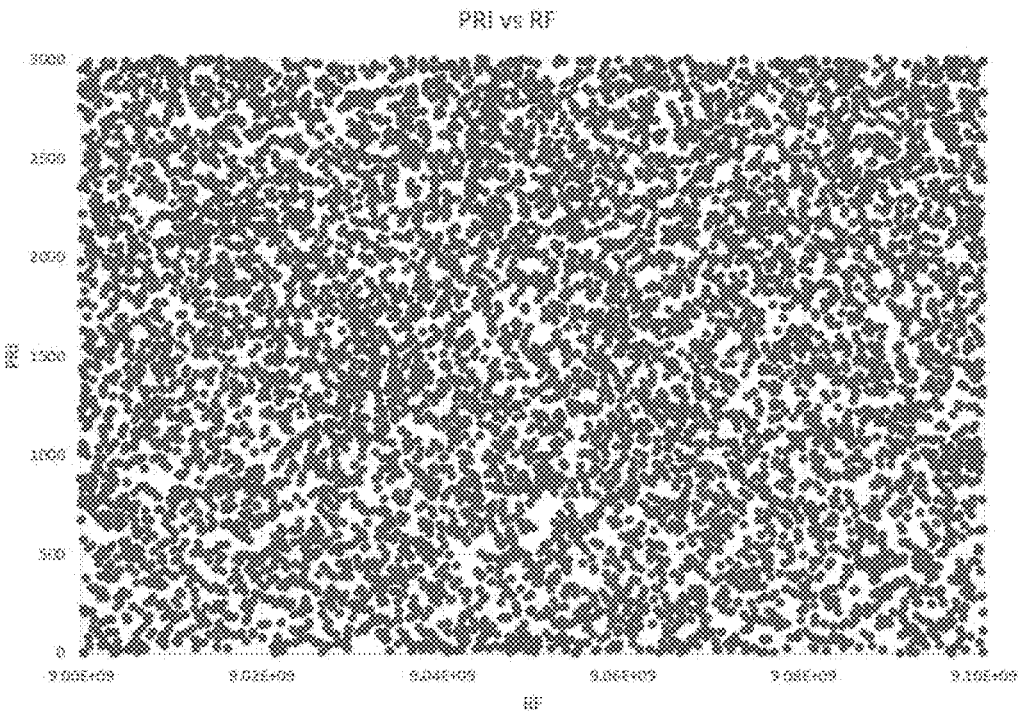
FIG. 1 is a graph illustrating a simulated slice of data representing RF vs. pulse repetition interval (PRI) data (RF/PRI data plane) suitable for deinterleaving, according to the present invention.

The disclosed methods and systems below may be described generally, as well as in terms of specific examples and/or specific embodiments. For instances where references are made to detailed examples and/or embodiments, it should be appreciated that any of the underlying principles described are not to be limited to a single embodiment, but may be expanded for use with any of the other methods and systems described herein as will be understood by one of ordinary skill in the art unless specifically otherwise stated.

As noted above, embodiments of the present invention may apply to any pulsed signal, e.g., radio frequency (RF), acoustic, underwater acoustic, electrocardiogram (EKG), optical, etc., that can be modeled as a set of defined intervals between pulses. While particular embodiments of the present invention are described with application to electronic intelligence gathering through radar receivers, the inventive system and method are not limited to this particular application. However, for illustrative purposes the various embodiments of systems and methods of deinterleaving multiple radar signals to determine known and unknown signal sources are described.

To gain a better appreciation for how the present invention is an improvement in the art of deinterleaving radar signals, a summary of conventional correlation-based deinterleaving techniques are described with reference to Richard G. Wiley, ELINT: The Interception and Analysis of Radar Signals, Artech House, 2006, the contents of which are incorporated herein by reference for all purposes. Wiley describes pulse deinterleaving techniques based upon correlation techniques using the parameter space of time series signals using pulse width and radio frequency to correlate and group together different signals and to deinterleave them into their original radar burst emission. These correlation techniques are based upon nearest neighbor association or constant position or zero rate parameter models. The groups are formed into what is known as radar bursts or a process of burst formation. For example, grouping all pulse information at a single radio frequency enables the formation of a constant pulse or a stagger type signal with timing source pulses emitted from the same radar. After burst formation, signal formation is performed, where bursts are linked across time in a periodic set analogous to a scanning radar that is repetitive each time its main lobe crosses through the sensor or collection system.

These standard aggregation techniques described by Wiley work well without necessarily using a model, but utilizing consistent gating and association techniques that are able to hold and extract constant time, space, parameter signals and aggregate, group, or track them and perform a mean and variance estimate of the random variables of the time series. Specifically at the end of radar signal processing chains, classical electronic intelligence (ELINT) parameters are discerned including: pulse repetition interval (PRI), RF, scan period (SCAN), pulse width or pulse duration (PW, PD). It will be understood that after full deinterleaving is performed from conventional techniques, a PRI, RF, SCAN, and PW are then provided. It is further understood that prior processing, there is no concept of what the PRI, RF, SCAN, or PW is going to be on output. Other processing chains using short, medium, and long sampling time periods enables the extraction or deinterleaving of short, medium, and long duration time series radar signal emissions. The advantages of the conventional techniques include the capability of deinterleaving signals that are new to collection systems, but require manual analysis to adjudicate the new signals. Conventional techniques enable the deinterleaving of many radar emissions without knowledge of the specific signal beforehand. However, manual review and consistent tuning and revisiting of processed data are required to make sure all signals of interest deinterleave properly by the collection system. The disadvantage of these conventional techniques is that they are correlating information blindly without a model as a reference to deinterleave. In contrast, the present invention uses a model and performs classification unlike conventional deinterleaver systems.

Figure 2:
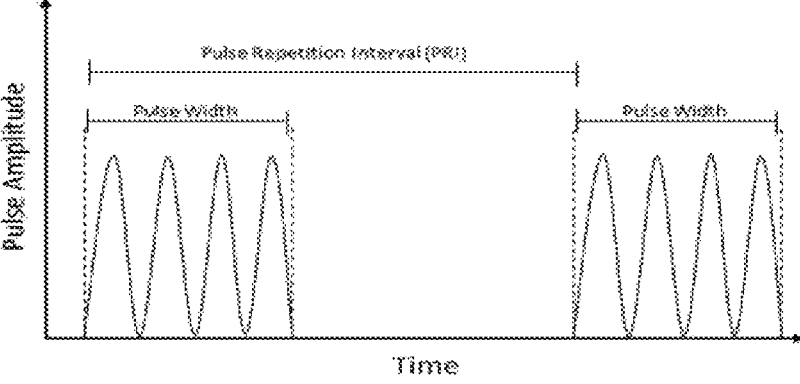
FIG. 2 is a graph of two exemplary radar pulses illustrating pulse width (PW) and PRI, according to the present invention.

FIG. 2 is a graph of a couple of radar pulses illustrating pulse width (PW) and pulse repetition interval (PRI) including pulse amplitude as a function of time, according to the present invention. The time between the start of consecutive radar transmissions (electromagnetic pulses) is defined as the pulse repetition interval (PRI), also called the pulse period or ranging interval.

In order to obtain an approximation of signals present in the environment, measurements must first be performed. A PDW may be generated from measurements performed by an intercept receiver or possibly a radar warning receiver. A PDW is a summary of an individual pulse from a radar. PDWs are generally multiple measurements made on received pulses that are then grouped together in a single data package. Each PDW generally includes the following parameters: a timestamp, pulse width, RF, pulse amplitude and pulse modulation (PMOD). A timestamp is the time of arrival (TOA) of the radar pulse at the receiver. The pulse width is the width of the pulse received and processed by the receiver. The RF is the frequency of the radar pulse at the receiver processor. The pulse amplitude is the height or amplitude of the pulse energy. The PMOD is the modulation type of the pulse. The polysweep system and method of the present invention does not use the PA or PMOD parameters that may be found in a PDW. The focus of the polysweep system and method of the present invention is the assignment and extraction of PDWs from a file or system (using the timestamp, pulse width and RF contained in PDWs) and assigning them to a known radar model.

Embodiments of the present invention include methods and systems configured for matching radar pulse trains (timestamp, pulse width and RF from PDWs) of known radar models against an interleaved time series of radar signals in a radar emission with generally unknown content to extract the radar pulse trains within the radar emission and labeling those matching sequences of radar pulse trains with their associated model. The remaining unknown or residue radar signals are left for further adjudication or classification by subject matter experts. Embodiments of the present invention utilize radar hardware system components (oscillating timing source for example) to match against an intermingled or interleaved time series of radar signals and extract out the matching radar pulse trains of the radar emission. It will be understood that the present invention does not require countdowns and clocks, i.e., the internal timing elements of the radar hardware. Rather the present invention only needs a list of PRIs which may be generated from clocks and countdowns from a known radar model.

According to other embodiments, the present invention may use pulse repetition intervals (PRIs) provided by a known radar model and uses the PRIs to match against pulses from an input source (e.g., file, or system) and extracts pulses as a match and in doing so classifies the signal as a match to the known radar model utilized. According to still other embodiments, the present invention may employ a set of adjudicated radar models from a technical document and utilizes the PRI information from each model to match against a set of pulse interleaved data from a radar collection system. When a match occurs, the pulse descriptor words are then extracted and classified as a match to the radar model utilized, thus forming a PRI set or pulse sequence or pulse group, and may then be output to the system user. Thus, the extracted radar pulse trains are deinterleaved. When a set of many radar signals are collected and thus interleaved (mixed) together, embodiments of the present invention perform as a model-based deinterleaver by utilizing adjudicated radar models to match pulse repetition intervals to the radar pulse train file and thus classify and extract the matching pulses for the user.

Embodiments of the present invention provide an automated deinterleaver for radar pulse collected data and to classify the deinterleaved pulses and provide them to a user or downstream system for further processing. The key feature of the various embodiments of the present invention is utilizing previously adjudicated radar models to classify and deinterleave newly collected/sensed data. Embodiments of the present invention employ known signal models to extract these same signals when they are collected in the future. Since there are known radars that have already been modeled and adjudicated from past collections and analysis, it is particularly useful to employ that known information for radar signal extraction. The present invention finds application not only in military electronic intelligence gathering but in any context, commercial or otherwise, which can benefit from deinterleaving radar signal data that has been gathered and potentially in real time.

FIG. 1 is a graph illustrating a simulated slice of radar pulse data representing RF vs. pulse repetition interval (PRI) data (RF/PRI data plane) suitable for deinterleaving, according to the present invention. As can be seen from FIG. 1, it is not obvious from visual observation what types of RF emitters may be found or what parameters might be associated with such RF emitter signatures. Finding unknown emitters in such RF data is near impossible without specialized RF analyst personnel that are subject matter experts with years of experience in their field. However, manually adjudicating the daunting number of radar signals is simply not possible.

To solve that technical problem, the inventors have developed novel systems and methods to deinterleave signals in archives of RF data to assist RF analysts with the daunting task of extracting useful information that may found in such RF/PRI data. The approach is data driven from real world data. Real world statistical estimates of radar hardware and signal generation capability are modeled and utilized to sweep through archived data and cull out known signals of interest. By removing known signals, only unknown or new signals will be leftover for an analyst, or subject matter expert, to adjudicate. The embodiments of the invention disclosed herein further address the technical problem of large percentages of RF intercept data never being evaluated for usefulness.

Figure 3:
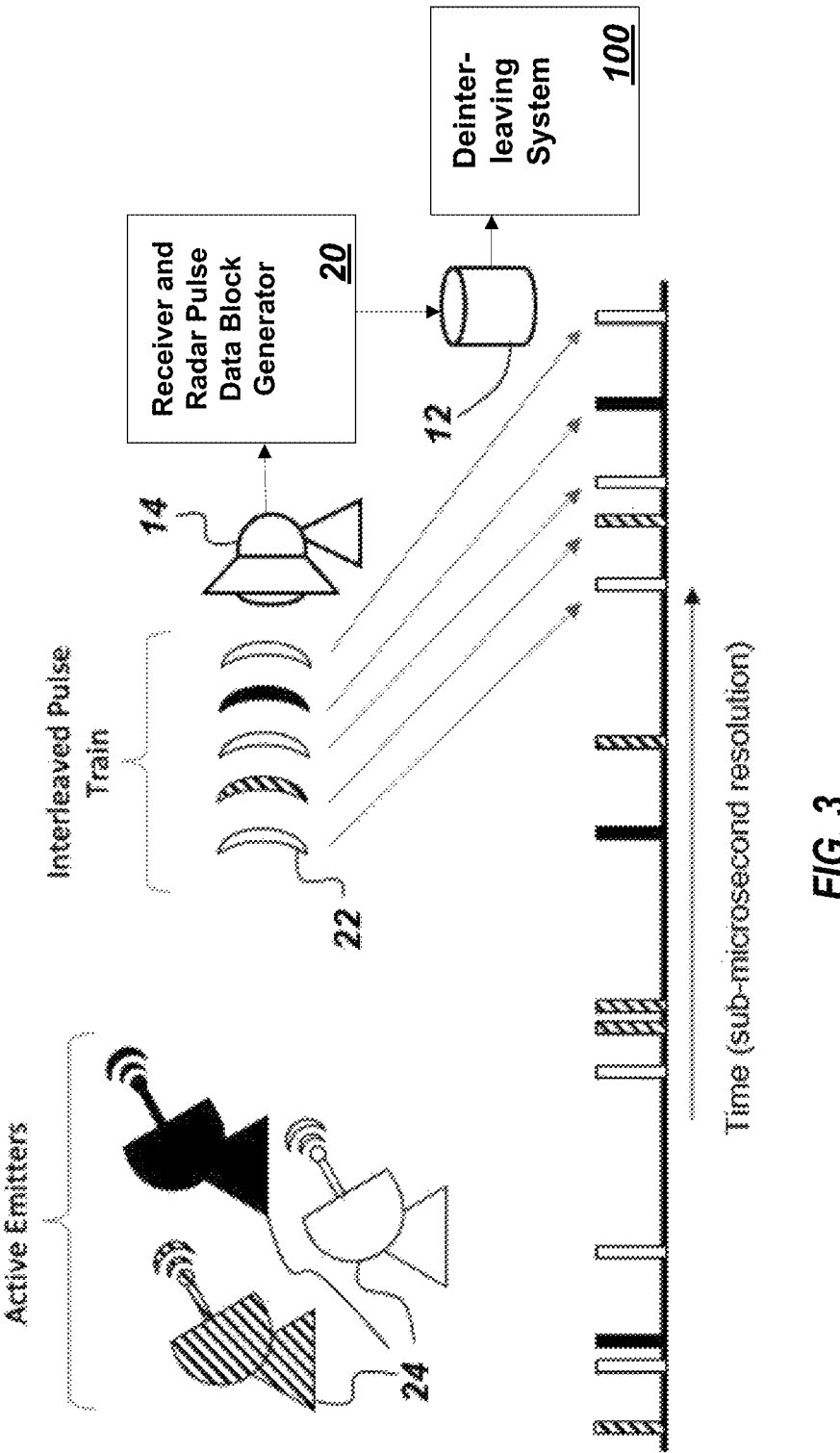
FIG. 3 is schematic illustration of radar emitters generating an interleaved pulse train for reception by a receiver and stored as pulse data block, according to the present invention.
Figure 4:
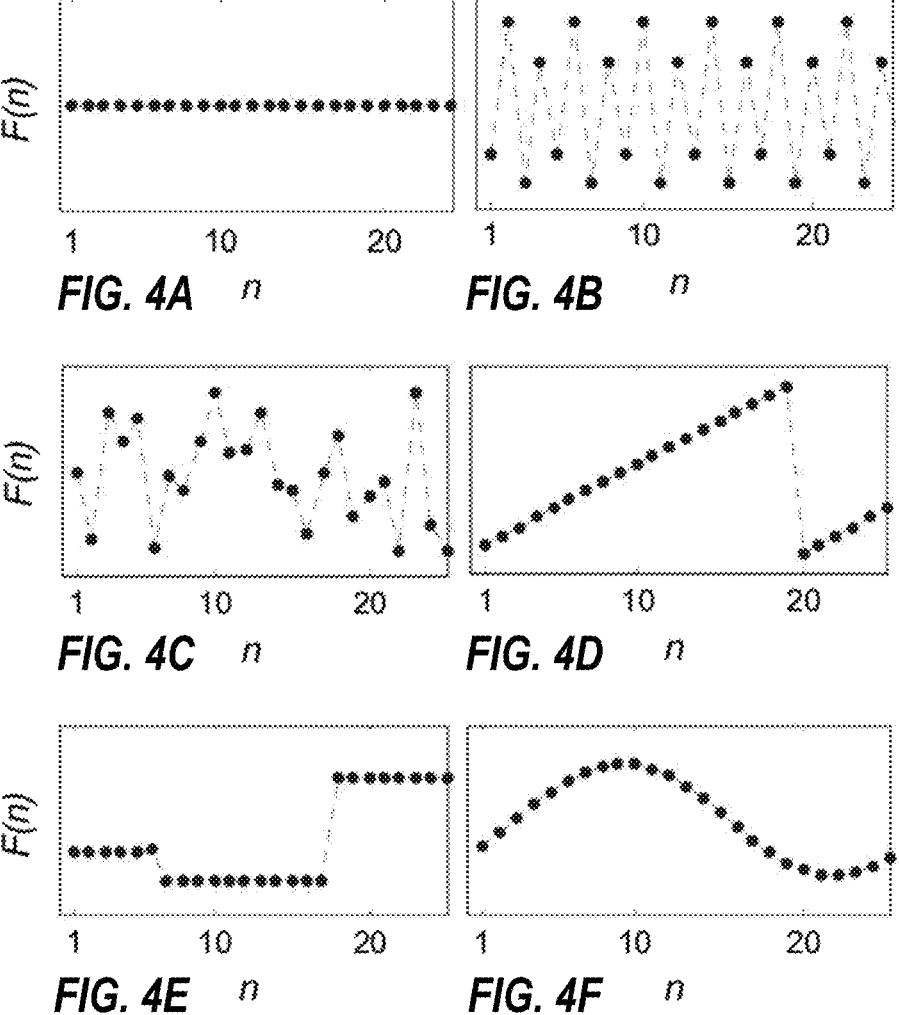
FIGS. 4A-4F illustrates six exemplary radar signal types, namely constant, stagger, jittered, sliding, dwell and switch, and periodic PRI modulation types, respectively.

FIG. 3 is schematic illustration of radar emitters 24 generating an interleaved pulse train 22 for reception by an antenna 14 and receiver 20 and stored 12 as pulse data block, according to the present invention. Various combinations of antenna 14, receiver and radar pulse data block generator 20 and storage 12 may be referred to herein as radar intercept. More particularly, FIG. 3 illustrates a plurality of active RF emitters 24 (three shown) generating an interleaved pulse train 22 for reception by antenna 14 and its associated receiver 20 configured to generate a pulse data block for storage 12 and further analysis using the polysweep engine (further described herein) of the present invention. It will be understood that each of the active emitters 24 may be unique and identified graphically by its associated fill color or shading, i.e., striped, black and white, in the upper left hand corner of FIG. 3. The interleaved pulse train 22 shown as spaced-apart partial moons in the upper central portion of FIG. 3 represents a five pulse segment of the entire interleaved pulse train 22 shown as radar pulses with corresponding arrows at the bottom of FIG. 3. It will be understood that the pulse train 22 may be measured in sub-microsecond time resolution as shown. Thus, by using passive electronic sensors or collection systems radar pulses can be recorded from the environment and stored or archived for processing. The difficulty, of course, is that the number and types of active emitters may not be known until subsequent analysis of the radar pulse data block archived in storage 12 is performed. The various embodiments of the present invention solve the technical problem of identifying known and unknown radar signals within a given radar pulse data block.

It is also important to note that there are many different types of radar signals. FIGS. 4A-4F illustrates six exemplary radar signal types, namely constant, stagger, jittered, sliding, dwell and switch, and periodic PRI modulation types, respectively. These and other types of known radar signals, with their known characteristics can be used to create a library of known radar signal models that may be used to parse a raw radar pulse data block consisting of PDWs to identify whether or not particular radar models are found within the radar pulse data block, according to the present invention. If a given radar model is found within the radar pulse data block, the data matching that given model may be extracted from the original radar pulse data block as a separate file leaving any unmatched pulses from the original radar pulse data block as residue radar signals for further matching and extracting until only unknown PDWs remain. In this way each radar model may be used to parse the radar data in the radar pulse data block in turn. It will be understood that the library of known radar models may be from any suitable domain, i.e., land, sea, air and space (all domains). The present invention is agnostic as to the spatial domain of the radars or radar models.

The present invention is a model-based deinterleaver system employing a polysweep engine or method. The system and method embodiments of the present invention are straightforward in design, implementation, and function. Method embodiments of the present invention utilize pulse repetition interval (PRI) data to match against pulse descriptor word (PDW) files or a set of interleaved pulses to extract and classify them. Method embodiments of the present invention may be used to evaluate a set of pulse descriptor words (PDWs) against known models, matching pulses to individual models and isolating PDWs not matched to any model. The inputs to the method may be a set or file of PDWs along with the description of radar models using PRI, RF, and other PDW information to match. The outputs of the system and method of the present invention may be a set of matched PDWs for a given input model as well as the residual PDWs that did not match any input model file.

Figure 5:
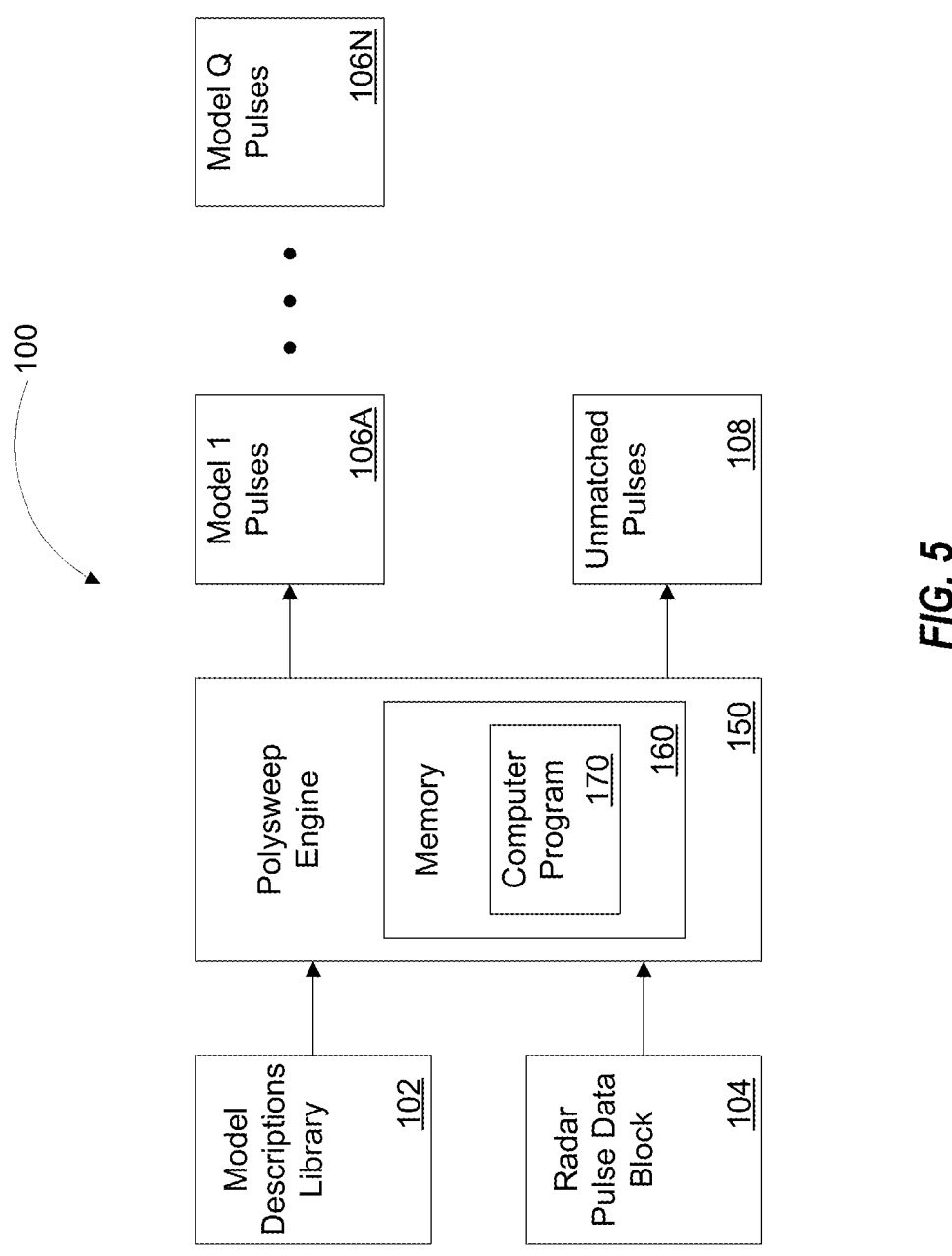
FIG. 5 is block diagram of an embodiment of a system for deinterleaving radar pulse data, according to the present invention.

FIG. 5 is block diagram of an embodiment of an embodiment of system 100 for deinterleaving radar pulse data, according to the present invention. As shown in FIG. 5, inputs to polysweep engine 150 may include known radar model descriptions, or a model descriptions library 102 and a radar pulse data block 104 including the radar signals to be deinterleaved for analysis. In one particular example, input pulse data block 104 may be sourced from storage 12 as shown in FIG. 3. Assuming the input pulse data block 104 includes pulses from known radar models, the output from the polysweep engine 150 may include data files 106A to 106N extracted from the input pulse data block 104, each data file 106A to 106N reflective of known model pulses from the model descriptions library 102. However, the input pulse data block 104 may also include unknown radar pulse signals that may be stored in an unmatched pulses data file 108 for further analysis. Polysweep engine 150 may include one or more processors (not shown) in communication with memory 160. The memory 160 may be configured to store data during the deinterleaving processing steps (discussed below) as well as for storing one or more computer programs 170. The one or more computer programs 170 may include computer instructions for execution by the one or more processors (not shown for simplicity) for implementing an embodiment of a method of deinterleaving pulse sequences in a radar pulse data block of unknown radar signals measured by a radar antenna and receiver, according to the present invention.

Description of an embodiment of the polysweep engine 150 processing steps follows. First, a set of n radar models, models(1 . . . n) stored in a model descriptions library 102 (see, FIG. 5) are processed with each model consisting of a radio frequency (RF) and a set of pulse repetition intervals (PRIs). The next step in the process is to start inputting pulse descriptor word (PDW) formatted data from a radar pulse data block 104 (FIG. 5). According to a particular embodiment, this step may include reading PDW formatted data from a hard drive, e.g., storage 12 (see, FIG. 3) or memory 160 (see, FIG. 5). The polysweep engine 150 then starts by utilizing the first radar model(1) with its associated RF(1) and PRIs(1 . . . k) and begins with the first PDW, or the reference pulse. RF(1) is used to gate out PDWs that are not within a preselected range for radar model(1). For example, and not by way of limitation, the preselected range may be a 3-sigma gate or +/−1 MHz around RF(1). According to this particular example, the polysweep engine 150 does not consider any PDW data that is outside of the 3-sigma range for a match to radar model(1). Thus, not all PDWs need to be searched thus improving performance of system 100. Next the polysweep engine 150 performs the pulse deinterleaving and matches the radar model(1) using the PDWs that passed the RF 3-sigma gate. Starting with the first PDW, or reference pulse, the polysweep engine 150 spans the time period of the RF gated interleaved pulse set and searches for a PDW or pulse whose time difference between itself and the reference pulse is equal or within a small number or epsilon gate around PRI(1) of the PRI set, PRI(1 . . . k), of the model(1). If a pulse gates within the PRI tolerance for a match, then it is stored as a possible match and it becomes the new reference pulse. From that new reference pulse, the next PRI, namely PRI(2), from PRI(1 . . . k) is tested to see if it can be found in the gated pulse list. If PRI(2) is found, it becomes the reference pulse and the process is continued until the kth PRI is found. From there, the next available pulse is set as the new reference pulse and the process repeats until no further PRI matches are in the radio signal data block. Hence the coined name "polysweep" because the radio signal data block is swept multiple times until no further matches can be found.

FIGS. 9A-9B are graphs illustrating PRI versus sequence number for exemplary linear and stagger radar model PRI sequences, respectively. FIG. 9C illustrates a summary of the data from the graphs shown in FIGS. 9A and 9B in tabular form. The tabulated values shown in FIG. 9C are hypothetical and provided to the reader to provide some understanding of what types of signals can lie in the RF domain.

A particularly useful feature of the polysweep engine 150 as it searches for PRI matches given a particular radar model, is that the pattern of the PRIs of a set do not have to be in a specific firing order. The polysweep engine 150 discovers the firing order or pattern of the particular radar signal pattern sequence. For example, it may be the case that rather than PRI(1) being a match to the first reference pulse, PRI(k) could be the first matching pulse. The order of the pulse match is discovered by the polysweep engine 150 as each PRI from the set of PRIs(1 . . . k) is considered to find a match given the particular radar model. If none of the PRIs in the set of PRIs, PRI(1 . . . k), is matched in the example discussed here, the next pulse in the gated list is considered as the reference pulse and the polysweep engine 150 again considers all PRIs(1 . . . k) as a possible match to the new reference pulse (second pulse in the file since the first pulse matched nothing in this example). If there is still not a match, then the third pulse in the file is set to the reference pulse and it is used to perform the polysweep against the PRIs(1 . . . k) in the current radar model under consideration. Each pulse in the gated list is eventually set to the reference pulse and the polysweep engine 150 attempts to match the remaining pulses until none are available to the radar model PRIs(1 . . . k) set.

Once the current radar model has exhausted the search for radar model(1) matches and the matching pulses have exceeded a predefined threshold (for example and not by way of limitation, 1,000 pulses must be deinterleaved by a polysweep to be considered for output and classification to a downstream file or processor) there will be j left over pulses in the list that still require deinterleaving. For the j remaining pulses, the next radar model, model(2), is evaluated with the above described polysweep method. If none of the j remaining pulses match radar model(2), then radar model(3) and the rest of the n radar models are all evaluated to deinterleave and classify the remaining pulses. Each pulse list (residue radar signals) after deinterleaving with a successful radar model becomes smaller and smaller until there is a minimal amount of pulses (PDWs) left. If none of the radar models(1 . . . n) match the pulses in the radar pulse data block, this implies that there is a radar signal that has been collected and that the polysweep does not have a model from its adjudicated list that matches the data. This would suggest to a radar analyst, or subject matter expert, that a new radar is available and further analysis is required to adjudicate the signal and creating a brand-new radar model (n+1) for the polysweep to utilize in the future.

According to another aspect of the present invention, a percentage error may be used to adjust the PRIs in order to find a set of pulses that fit within the boundaries of PRIs for a given radar model. Once a sequence of radar signals and their associated set of PRIs are found, one can estimate the phase of the noisy estimate of the PRI sequence. Given the noisy estimate, an user can either increase or decrease from the PRI model point to adjust the noisy estimate. Given the growing or shrinking error, the error percentage can be readjusted by taking the sum of the PRI estimates and divide by it. This provides a refined error percentage that is specific to this emitter and data collection. Using this refined error percentage, the polysweep engine can be rerun for this dataset. In this way, the error may be minimized allowing the polysweep engine to land specifically near the midpoint of new PRIs derived by using the original sum of PRIs and the refined error estimate.

Figure 6:
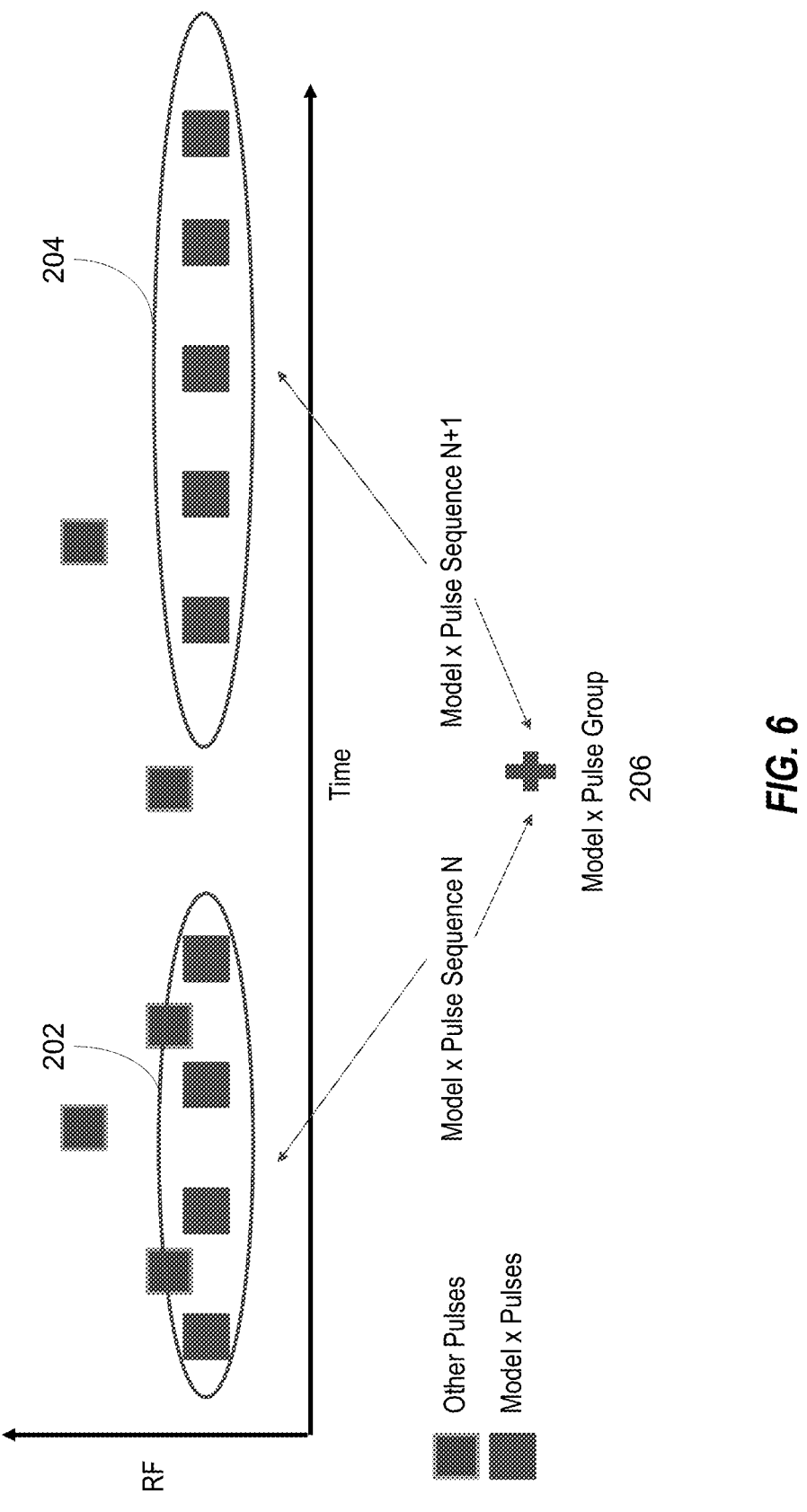
FIG. 6 is a graph illustrating the concepts of pulse sequences and pulse groups, according to the present invention.

Some additional definitions and criteria are useful for understanding the present invention. A "pulse sequence" is a set of individual pulses matching a model. Various matching criteria may be used to match individual pulses to a given model. For example, and not by way of limitation, matching criteria may include model RF and model PRI. A pulse sequence terminates when there are no more pulses following the last pulse in the set that meet the matching criteria. It is also important to determine validity of a pulse sequence. More particularly, a pulse sequence is considered valid when it includes a preselected minimum number of pulses and when it includes a minimum number of unique PRIs. A "pulse group" is a set of individual pulses from pulse sequences that matched a model. Validity of pulse groups must also be determined. More particularly, a pulse group is considered valid when the total number of individual pulses within its pulse sequences meets a preselected minimum threshold. FIG. 6 is a graph illustrating the concepts of pulse sequences and pulse groups, according to the present invention. More particularly, the four pulses in the left oval are model x pulse sequence n 202. The five pulses in the right oval are model x pulse sequence n+1 204. Together, sequences 202 and 204 form a model x pulse group 206.

Figure 7:
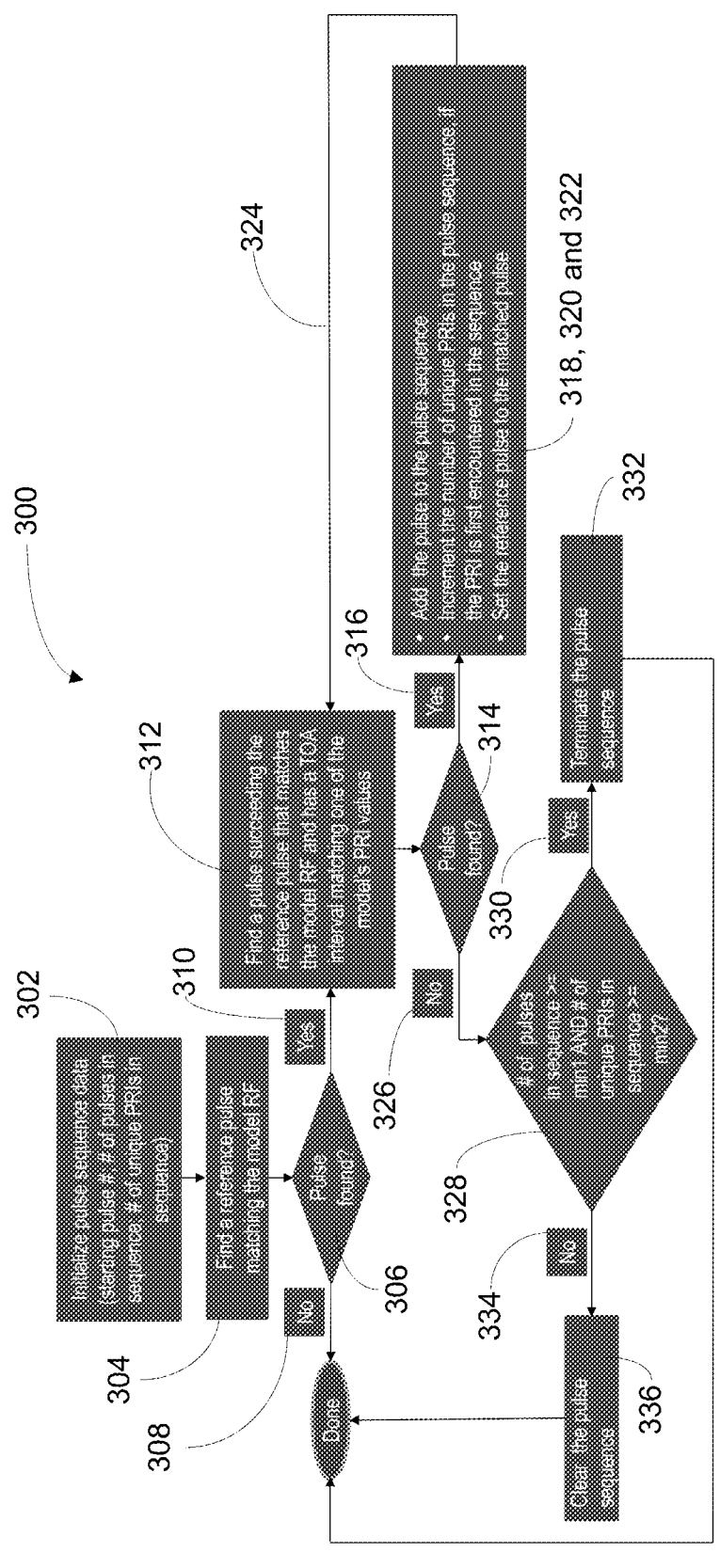
FIG. 7 is a flowchart of an exemplary method of identifying pulse sequences, according to the present invention.

FIG. 7 is a flowchart of an exemplary method 300 of identifying pulse sequences, according to the present invention. Method 300 may include initializing 302 pulse sequence data. Initializing 302 pulse sequence data may include starting pulse number, number of pulses in sequence, number of unique PRIs in sequence, according to the particular method 300 illustrated in FIG. 7. Method 300 may further include searching 304 for a reference pulse matching the model RF. Method 300 includes a decision point for branching at point 306. If no matching reference pulse is found 308, method 300 is done. If there is a matching reference pulse 310, method 300 proceeds with searching 312 for a pulse succeeding the reference pulse that matches the model RF and having a TOA interval matching one of the model's PRI values. Method 300 further includes another decision point for branching at point 314. If a succeeding pulse is found 316 method 300 further includes adding 318 that succeeding pulse to the pulse sequence, incrementing 320 the number of unique PRIs in the pulse sequence, if the PRI is first encountered in the pulse sequence, setting 322 the reference pulse to the matched pulse and then returning 324 to searching 312 for another succeeding pulse. If a succeeding pulse is not found 326, method 300 proceeds to decision point 328. Decision point 328 asks whether the number of pulses in sequence is greater than or equal to a predetermined minimum, min1, in addition to the number of unique PRIs in sequence being greater than or equal to a predetermined minimum, min2. If the answer at decision point 328 is yes 330, method 300 includes terminating 332 the pulse sequence followed by concluding method 300. If the answer at decision point 328 is no 334, method 300 further includes clearing 336 the pulse sequence followed by concluding method 300.

Figure 8:
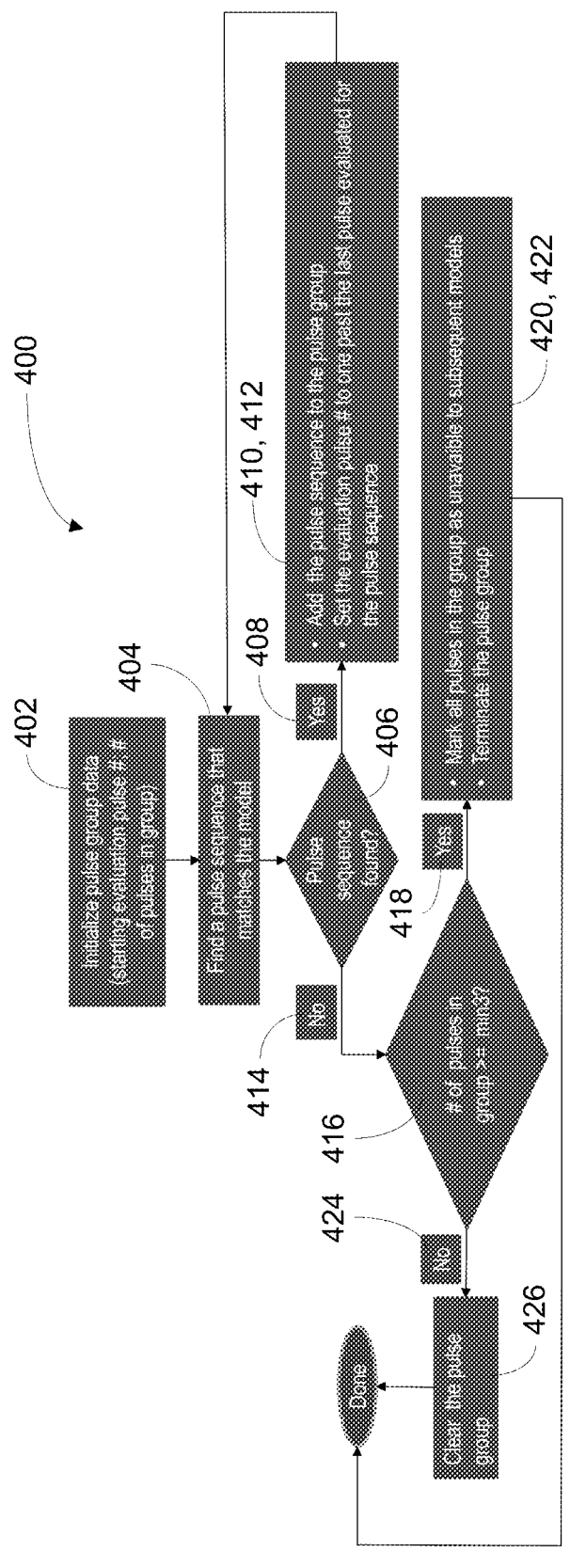
FIG. 8 is a flowchart of an exemplary method of identifying pulse groups, according to the present invention.

FIG. 8 is a flowchart of an exemplary method 400 of identifying pulse groups, according to the present invention. Method 400 may begin by initializing 402 pulse group data. According to the illustrated embodiment, pulse group data may include starting evaluation pulse number and number of pulses in the pulse group. Once pulse group data has been initialized 402, method 400 may further include finding 404 a pulse sequence that matches the model. If a pulse sequence is found 408 at decision point 406, method 400 may further include adding 410 the pulse sequence to the pulse group and setting 412 the evaluation pulse number to one past the last pulse evaluated for the pulse sequence. If, however, a pulse sequence is not found 414, then method 400 may further include another decision point 416. Decision point 416 of method 400 asks whether the number of pulses in the pulse group is greater than or equal to a preselected value, min3. If the number of pulses in the pulse group is greater than or equal to the preselected value, min3, 418 then method 400 proceeds with marking 420 all pulses in that group as unavailable to subsequent models, terminating 422 the pulse group followed by concluding method 400. If, however, the number of pulses in the pulse group is not greater than or equal to the preselected value, min3, 424 then method 400 proceeds with clearing 426 the pulse group followed by concluding method 400.

FIG. 10 is a flowchart of an embodiment of a method 500 of deinterleaving pulse sequences in a radar pulse data block of intermingled radar signals measured by an intercept receiver, according to the present invention. According to the embodiment of method 500, each individual pulse in the radar pulse data block may be defined by a PDW, each PDW having at minimum, a pulse TOA, a PW and a RF. The embodiment of method 500 may include providing 502 a model descriptions library of known radar models, wherein each of the known radar models includes a known RF or range of RF and a set of PRIs forming a pulse sequence associated with each of the known radar models. According to particular embodiments of method 500, the model descriptions library of known radar models may include all radar domain models, i.e., land, sea, air and space radar models.

The embodiment of method 500 may further include providing 504 a polysweep engine configured to receive the radar pulse data block and the known radar models. Embodiments of polysweep engine 150 described herein may be provided in accordance with embodiments of method 500. It will be understood that embodiments of a polysweep engine may include specialized or general purpose computing hardware configured with one or more processors, computer memory for storing data and computer programs. It will be further understood that polysweep engine embodiments may be configured to work with radar intercept hardware that gathers radar pulse data blocks of intermingled and interleaved radar signals.

The embodiment of method 500 may further include the polysweep engine comparing 506 each of the known radar models to each of the individual pulses to identify one or more pulse sequences matching the known radar models. According to a particular embodiment of method 500, the comparing 506 may further include comparing each PRI of the set of PRIs of each of the known radar models with each PRI estimated from the PDWs in the radar pulse data block having matching RF. According to this particular embodiment of method 500, the comparing 506 may further include for each matching PRI, assembling a matching pulse sequence. According to another embodiment of method 500, the comparing 506 may further include gating subsequent candidate matching pulses by model RF. According to still another embodiment of method 500, the gating may further include a preselected window around the model RF. According to yet still another embodiment of method 500, the preselected window may include either a 3-sigma gate or + or − epsilon.

The embodiment of method 500 may further include the polysweep engine extracting 508 the matching pulse sequences from the radar pulse data block leaving residue radar signals. According to a particular embodiment of method 500, the extracting 508 may further include identifying the matching pulse sequences, identifying the matching pulse groups from the identified matching pulse sequences and adding the identified matching pulse sequences to the identified matching pulse groups.

The embodiment of method 500 may further include the polysweep engine saving 510 each of the matching pulse sequences or matching pulse groups associated with its associated known radar model. The matching pulse sequences or matching pulse groups saved with its associated known radar model may, for example and not by way of limitation, be saved to computer storage or to computer readable storage media for accessing at a later time or for further analysis. According to yet another embodiment, the saving step may include saving each of the matching pulse sequences associated with its associated known radar model as a file on a computer readable storage medium. The embodiment of method 500 may further include providing the residue radar signals for further analysis by a subject matter expert or other analysis tool. According to a more particular embodiment of method 500, providing of the residue radar signals for further analysis by a subject matter expert or other analysis tool may include saving the residue radar signals as a file on a computer readable storage medium. Thus, manual review of previously unknown radar signals may be required to adjudicate and identify the source radar emitter and to add such freshly adjudicated radar signal to the library of known radar signals.

According to an embodiment of method 500, the identifying of the matching pulse sequences may further include initializing pulse sequence data including: pulse sequence, starting pulse number, number of pulses in sequence and number of unique PRIs in sequence. According to this particular embodiment of method 500, the identifying of the matching pulse sequences may further include finding a reference pulse matching the model RF. If the reference pulse is found, method 500 continues with finding a pulse succeeding the reference pulse that matches the model RF and that has a TOA difference matching one of the set of model PRI values. If the succeeding pulse is found, method 500 continues adding the succeeding pulse to the pulse sequence, incrementing the number of unique PRIs in the matching pulse sequence if matching PRI value is first encountered in the pulse sequence, then updating the reference pulse to the last found pulse. If the succeeding pulse is not found, method 500 continues determining if the number of pulses in sequence is greater than or equal to a preselected value, min1, and the number of unique PRIs in sequence is greater than or equal to a preselected value, min2. If yes, then terminating the matching pulse sequence and continuing with next step in method 500. If no, then clearing the pulse sequence and continuing with next step in method 500. If the reference pulse is not found, continuing with next step in method 500. A particular embodiment of identifying the matching pulse sequences 300 is shown in FIG. 7 and described herein.

According to one embodiment of method 500, the identifying of the matching pulse groups may further include initializing pulse group data including: pulse group, starting evaluation pulse number and number of pulses in group. According to this particular embodiment of method 500, the identifying of the matching pulse groups may further include finding a pulse sequence matching the radar model. If a matching pulse sequence is found, method 500 continues adding the matching pulse sequence to the pulse group and setting the evaluation pulse number to one past last pulse evaluated for the pulse sequence. If a matching pulse sequence is not found, method 500 continues determining if the number of pulses in the group is greater than or equal to a preselected value, min3. If yes, then marking all pulses in the group as unavailable to subsequent models and terminating the pulse group. If no, then clearing the pulse group and continuing with next step in method 500.

Figure 11:
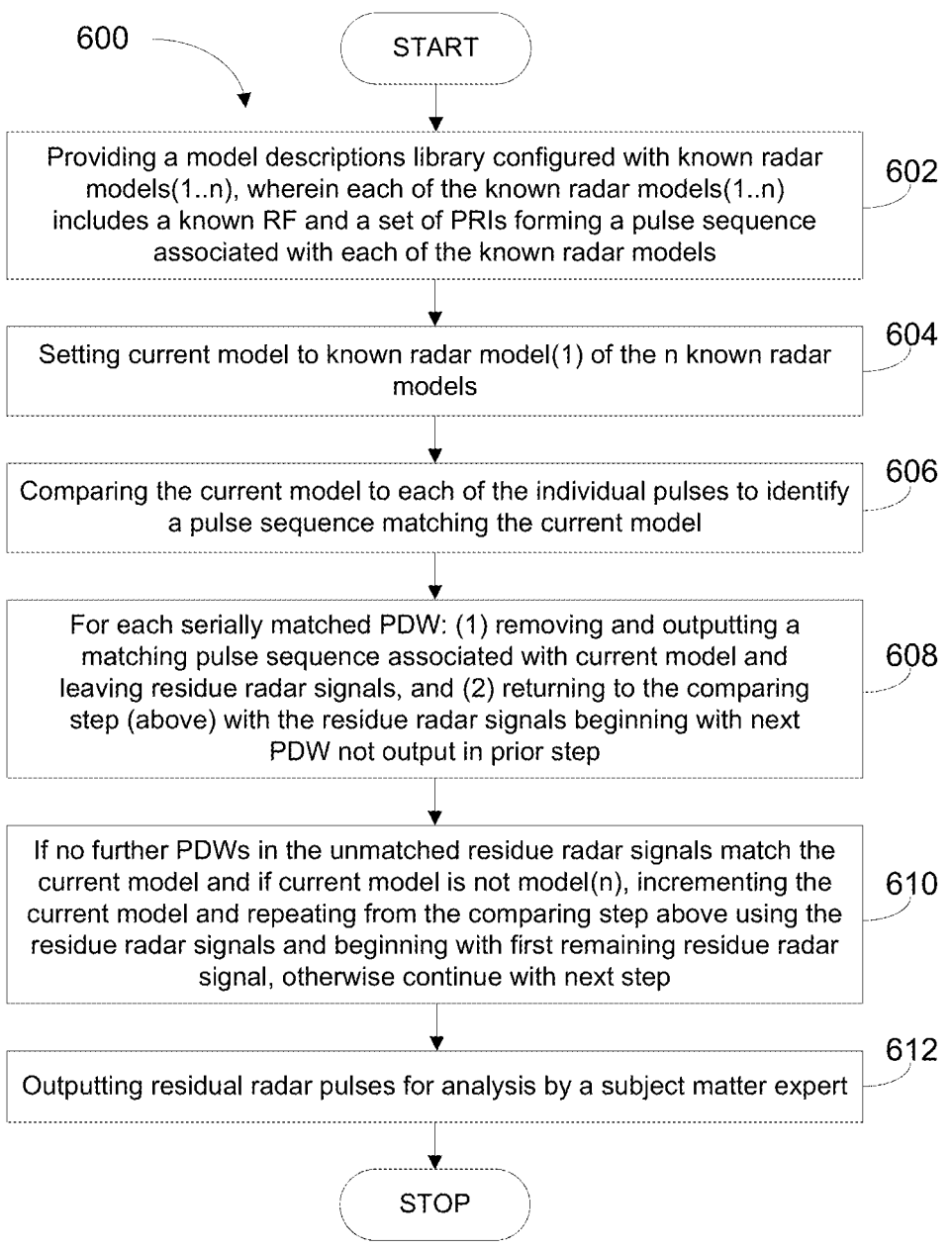
FIG. 11 is flowchart of another embodiment of a method of deinterleaving pulse sequences in a radar pulse data block of intermingled radar signals, according to the present invention.

FIG. 11 is flowchart of another embodiment of a method 600 of deinterleaving pulse sequences in a radar pulse data block of intermingled radar signals measured by an intercept antenna and receiver, where each individual pulse in the radar pulse data block may be defined by a PDW, each PDW having at a minimum, a pulse TOA, a PW and a RF. The method 600 of deinterleaving may include providing 602 a model descriptions library configured with known radar models(1 . . . n), wherein each of the known radar models(1 . . . n) includes a known RF and a set of PRIs forming a pulse sequence associated with each of the known radar models. The method 600 of deinterleaving may further include setting 604 the current model to known radar model(1) of the n known radar models. The method 600 of deinterleaving may further include comparing 606 the current model to each of the individual pulses to identify a pulse sequence matching the current model. The method 600 of deinterleaving may further include for each serially matched PDW removing and outputting 608 a matching pulse sequence associated with current model and leaving residue radar signals and returning to the comparing step with the residue radar signals beginning with next PDW not output in prior step. The method 600 of deinterleaving may further include if no further PDWs in the unmatched residue radar signals match the current model and if current model is not model (n), incrementing 610 the current model and repeating from the comparing step above using the residue radar signals and beginning with first remaining residue radar signal, otherwise continue with next step. The method 600 of deinterleaving may further include outputting 612 residual radar pulses for analysis by a subject matter expert.

Having described some particular embodiments of the present invention with reference to the drawings, additional generic system-level embodiments are described below. A system for deinterleaving pulse sequences in a radar pulse data block of intermingled radar signals measured by an intercept antenna and receiver is disclosed. According to this deinterleaving system embodiment, each individual pulse in the radar pulse data block may be defined by a PDW. Each PDW may include at a minimum, a pulse TOA, a PW and a RF. The embodiment of the deinterleaving system may include the intercept antenna and receiver receiving the radar pulse data block. According to this system embodiment, the radar pulse data block may include an interleaved train of intermingled radar pulse signals. It will be understood that this interleaved train of pulse signals may originate from separate radar emitters of various configurations, perhaps known and/or unknown to the user. The embodiment of the deinterleaving system may further include computer storage configured for storing the radar pulse data block. The embodiment of the deinterleaving system may further include a model descriptions library configured with known all domain radar models, wherein each of the known radar models includes a known RF and a set of PRIs forming a pulse sequence associated with each of the known radar models. The embodiment of the deinterleaving system may be configured to receive the radar pulse data block from the computer storage and each of the radar models from the model descriptions library.

The embodiment of a deinterleaving system may further include a polysweep engine including at least one processor, a memory configured for storing data and a computer program, the computer program including machine-readable computer instructions for performing a method of deinterleaving pulse sequences. According to this embodiment of the deinterleaving system, the polysweep engine may further be configured to output one or more matching pulse sequences deinterleaved from the radar pulse data block along with any remaining residue or unmatched radar pulses from the radar pulse data block. One particular embodiment of a polysweep engine 150 is shown in FIG. 5 with related description herein. Various embodiments of a method of deinterleaving pulse sequences from a radar pulse data block suitable for use with this system embodiment have already been disclosed herein with reference to the drawings.

There are several advantages in using embodiments of the present invention over conventional deinterleaving processing techniques. One advantage is that it deinterleaves data that matches adjudicated (known) radar models. Conventional techniques perform correlation based on conventional ELINT parameters and group matching signals together starting with radio frequency and pulse width parameters. From this point conventional deinterleavers group pulses that match in frequency. Several different grouping or aggregation techniques may be employed to finally produce a formed signal. As a result, a conventional deinterleaver has pulses grouped together, but it could have mixed signals and errors in the formation. The present invention in contrast uses adjudicated radar models and therefore knows what it is matching against and does not have to group across parametric spaces. Additionally, the embodiments of the present invention deinterleave radar signals across classical ELINT parameters from a radar model all at once.

Another advantage of the present invention is that each matching signal sequence is classified or identified. Conventional deinterleave techniques do not classify. Rather, conventional techniques perform a subsequent step and match the deinterleaved signal against a radar model database that contains overlapping and ambiguous data. Signals matched using the embodiments of the present invention necessarily perform classification from using known radar models at the outset.

Still another advantage of the present invention includes discovering the pattern, or firing order, of the pulse repetition interval sequence. Conventional techniques have many aggregation steps and sometimes the averaging and linking do not produce a firing order sequence. The present invention additionally has no limit on the range of the firing order/pattern.

Yet another advantage of the present invention is its ability to deinterleave pulses until the signal is no longer detected. Thus, the inventive deinterleaver continues until the radar has turned off or the collector threshold is not able to sense the radar. Conventional techniques may throw away trailing pulses. Additionally, conventional technique may fail to deinterleave the full signal. In contrast, the embodiments of the present invention deinterleave all available radar signal pulses.

Still yet another advantage of the present invention is its capability of finding the starting pulse of the subsequent main beam lobe for scanning radar systems. Conventional deinterleaving techniques have to perform a function to link bursts that it has formed across time. According to conventional techniques, if the bursts are not capable of being linked then portions of the signal are not deinterleaved or the signal is not formed due to lack of bursts linked together into a signal. Embodiments of the present invention are not limited by time and can continue to search and find the next set of main lobe pulses from the scanning radar.

Another advantage of the present invention is that all available pulses that match a radar model are deinterleaved and then output as a single signal. Conventional deinterleavers, through thresholding and aggregation techniques, drop a large amount of pulse data. This dropped pulse data is not available for a complete signal estimate using conventional techniques.

In understanding the scope of the present invention, the term "configured" as used herein to describe a component, section or part of a device includes hardware and/or software that is constructed and/or programmed to carry out the desired function. In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Finally, terms of degree such as "substantially", "about" and "approximately" as used herein mean a reasonable amount of deviation of the modified term such that the end result is not significantly changed.

From the above description of the embodiments of the systems and methods of deinterleaving radar signals, it is manifest that various alternative structures and method steps may be used for implementing features of the present invention without departing from the scope of the claims. The described embodiments are to be considered in all respects as illustrative and not restrictive. It will further be understood that the present invention may suitably comprise, consist of, or consist essentially of the component parts, method steps and limitations disclosed herein. The method and/or apparatus disclosed herein may be practiced in the absence of any element that is not specifically claimed and/or disclosed herein.

While the foregoing advantages of the present invention are manifested in the detailed description and illustrated embodiments of the invention, a variety of changes can be made to the configuration, design and construction of the invention to achieve those advantages. Hence, reference herein to specific details of the structure and function of the present invention is by way of example only and not by way of limitation.

16

What is claimed is:

1. A method of deinterleaving pulse sequences in a radar pulse data block of intermingled radar signals measured by an intercept receiver, each individual pulse in the radar pulse data block defined by a pulse descriptor word (PDW), each PDW having at minimum, a pulse time of arrival (TOA) a pulse width (PW) and a radio frequency (RF), the method comprising:

providing a model descriptions library of known radar models, wherein each of the known radar models includes a known RF or range of RF and a set of pulse repetition intervals (PRIs) forming a pulse sequence associated with each of the known radar models;

providing a polysweep engine configured to receive the radar pulse data block and the known radar models;

the polysweep engine comparing each of the known radar models to each of the individual pulses to identify one or more pulse sequences matching the known radar models;

the polysweep engine extracting the matching pulse sequences or matching pulse groups from the radar pulse data block leaving residue radar signals, wherein the extracting of the matching pulse sequences from the radar pulse data block further comprises:

identifying the matching pulse sequences, wherein the identifying of the matching pulse sequences further comprises:

initializing pulse sequence data including pulse sequence, starting pulse number, number of pulses in sequence and number of unique PRIs in sequence;

searching for a reference pulse matching the model RF;

if the reference pulse is found, searching for a pulse succeeding the reference pulse that matches the model RF and has a TOA difference matching one of the set of model PRI values;

if the succeeding pulse is found, adding the succeeding pulse to the pulse sequence, incrementing the number of unique PRIs in the matching pulse sequence if matching PRI value is first encountered in the pulse sequence, then updating the reference pulse to the last found pulse;

if the succeeding pulse is not found, determining if the number of pulses in sequence is greater than or equal to a preselected value, min1, and the number of unique PRIs in sequence is greater than or equal to a preselected value, min2;

if yes, then terminating the matching pulse sequence and continuing with next step; and if no, then clearing the pulse sequence and continuing with next step; and if the reference pulse is not found, continuing with next step;

identifying the matching pulse groups from the identified matching pulse sequences; and adding the identified matching pulse sequences to the identified matching pulse groups;

the polysweep engine saving each of the matching pulse sequences associated with its associated known radar model; and providing the residue radar signals for further analysis by a subject matter expert or other analysis tool.

2. The method of deinterleaving pulse sequences according to claim 1, wherein the model descriptions library of known radar models comprises land, sea, air and space radar models.

3. The method of deinterleaving pulse sequences according to claim 1, wherein the comparing further comprises:

comparing each PRI of the set of PRIs of each of the known radar models with each PRI estimated from the PDWs in the radar pulse data block having matching RF; and for each matching PRI, assembling a matching pulse sequence.

4. The method of deinterleaving pulse sequences according to claim 1, wherein the comparing further comprises gating subsequent candidate matching pulses by model RF.

5. The method of deinterleaving pulse sequences according to claim 4, wherein the gating further comprises a preselected window around the model RF.

6. The method of deinterleaving pulse sequences according to claim 1, wherein the identifying of the matching pulse groups further comprises:

initializing pulse group data including pulse group, starting evaluation pulse number and number of pulses in group;

searching for a pulse sequence matching the radar model;

if a matching pulse sequence is found, adding the matching pulse sequence to the pulse group and setting the evaluation pulse number to one past last pulse evaluated for the pulse sequence;

if a matching pulse sequence is not found, determining if the number of pulses in the group is greater than or equal to a preselected value, min3;

if yes, then marking all pulses in the group as unavailable to subsequent models and terminating the pulse group; and if no, then clearing the pulse group and continuing with next step.

7. The method of deinterleaving pulse sequences according to claim 1, wherein the saving each of the matching pulse sequences associated with its associated known radar model comprises saving each of the matching pulse sequences associated with its associated known radar model as a file on a computer readable storage medium.

8. The method of deinterleaving pulse sequences according to claim 1, wherein the providing of the residue radar signals for further analysis by a subject matter expert or other analysis tool comprises saving the residue radar signals as a file on a computer readable storage medium.

9. A system for deinterleaving pulse sequences in a radar pulse data block of intermingled radar signals measured by an intercept antenna and receiver, each individual pulse in the radar pulse data block defined by a pulse descriptor word (PDW), each PDW having at a minimum, a pulse time of arrival (TOA), a pulse width (PW) and a radio frequency (RF), the system comprising:

the intercept antenna and receiver receiving the radar pulse data block comprising an interleaved train of intermingled radar pulse signals;

computer storage for storing the radar pulse data block;

a model descriptions library configured with known all domain radar models, wherein each of the known radar models includes a known RF and a set of PRIs forming a pulse sequence associated with each of the known radar models;

the deinterleaving system configured to receive the radar pulse data block from the computer storage and each of the radar models from the model descriptions library, the deinterleaving system further comprising:

a polysweep engine including at least one processor, a memory configured for storing data and a computer program, the computer program including machine-readable computer instructions for performing a method of deinterleaving pulse sequences wherein the method of deinterleaving pulse sequences comprises:

comparing each of the known radar models to each of the individual pulses to identify one or more pulse sequences matching the known radar models;

extracting the matching pulse sequences from the radar pulse data block leaving residue radar signals, wherein the extracting of the matching pulse sequences from the radar pulse data block further comprises:

identifying the matching pulse sequences, wherein the identifying of the matching pulse sequences further comprises:

initializing pulse sequence data including pulse sequence, starting pulse number, number of pulses in sequence and number of unique PRIs in sequence;

searching for a reference pulse matching the model RF:

if the reference pulse is found, finding a pulse succeeding the reference pulse that matches the model RF and has a TOA difference matching one of the model's PRI values;

if the succeeding pulse is found, adding the succeeding pulse to the pulse sequence, incrementing the number of unique PRIs in the matching pulse sequence if matching PRI value is first encountered in the pulse sequence, then updating the reference pulse to the succeeding pulse found;

if the succeeding pulse is not found, determining if the number of pulses in sequence is greater than or equal to a preselected value, min1, and the number of unique PRIs in sequence is greater than or equal to a preselected value, min2;

if yes, then terminating the matching pulse sequence and continuing with next step; and if no then clearing the pulse sequence and continuing with next step; and if the reference pulse is not found, continuing with next step;

identifying matching pulse groups from the identified matching pulse sequences, and adding the identified matching pulse sequences to the identified matching pulse groups;

saving each of the matching pulse sequences associated with its associated known radar model; and providing the residue radar signals for further analysis; and the polysweep engine further configured to output one or more matching pulse sequences deinterleaved from the radar pulse data block and any remaining residue or unmatched radar pulses from the radar pulse data block.

10. The system according to claim 9, wherein the comparing further comprises:

comparing each PRI of the set of PRIs of each of the known radar models with each PRI estimated from the residue PDWs in the radar pulse data block having matching RF; and for each matching PRI assembling a matching pulse sequence.

11. The system according to claim 10, wherein the comparing further comprises gating subsequent candidate matching pulses by model RF.

12. The method of deinterleaving pulse sequences according to claim 9, wherein the identifying of the matching pulse groups further comprises:

initializing pulse group data including pulse group, starting evaluation pulse number and number of pulses in group;

searching for a pulse sequence matching the known radar model;

if a matching pulse sequence is found, adding the matching pulse sequence to the pulse group and setting the evaluation pulse number to one past last pulse evaluated for the pulse sequence;

if a matching pulse sequence is not found, determining if the number of pulses in the group is greater than or equal to a preselected value, min3;

if yes, then marking all pulses in the group as unavailable to subsequent models and terminating the pulse group; and if no, then clearing the pulse group and continuing with next step.

13. A polysweep engine for deinterleaving pulse sequences in a radar pulse data block of intermingled radar signals measured by an intercept antenna and receiver, each individual pulse in the radar pulse data block defined by a pulse descriptor word (PDW), each PDW having at a minimum, a pulse time of arrival (TOA), a pulse width (PW) and a radio frequency (RF), the radar pulse data block stored in computer storage along with a model descriptions library configured with known all domain radar models, wherein each of the known radar models includes a known RF and a set of PRIs forming a pulse sequence associated with each of the known radar models, the polysweep engine comprising:

at least one processor;

a memory configured for storing data and a computer program including machine-readable computer instructions for executing a method of deinterleaving pulse sequences;

wherein the method of deinterleaving pulse sequences comprises:

receiving the radar pulse data block from the computer storage and each of the radar models from the model descriptions library;

comparing each of the known radar models to each of the individual pulses to identify one or more pulse sequences matching the known radar models;

extracting the matching pulse sequences from the radar pulse data block leaving residue radar signals, wherein the extracting of the matching pulse sequences from the radar pulse data block further comprises:

identifying the matching pulse sequences, wherein the identifying of the matching pulse sequences further comprises:

initializing pulse sequence data including pulse sequence, starting pulse number, number of pulses in sequence and number of unique PRIs in sequence;

searching for a reference pulse matching the model RF;

if the reference pulse is found, finding a pulse succeeding the reference pulse that matches the model RF and has a TOA difference matching one of the model's PRI values;

if the succeeding pulse is found, adding the succeeding pulse to the pulse sequence, incrementing the number of unique PRIs in the matching pulse sequence if matching PRI value is first encountered in the pulse sequence, then updating the reference pulse to the succeeding pulse found;

if the succeeding pulse is not found, determining if the number of pulses in sequence is greater than or equal to a preselected value, min1, and the number of unique PRIs in sequence is greater than or equal to a preselected value, min2;

if yes, then terminating the matching pulse sequence and continuing with next step; and if no, then clearing the pulse sequence and continuing with next step; and if the reference pulse is not found, continuing with next step;

identifying matching pulse groups from the identified matching pulse sequences; and adding the identified matching pulse sequences to the identified matching pulse groups;

storing each of the matching pulse sequences associated with its associated known radar model in the computer storage; and storing the residue radar signals for further analysis in the computer storage.

14. The polysweep engine according to claim 13, wherein the comparing further comprises:

comparing each PRI of the set of PRIs of each of the known radar models with each PRI estimated from the residue PDWs in the radar pulse data block having matching RF; and for each matching PRI assembling a matching pulse sequence.

15. The polysweep engine according to claim 14, wherein the comparing further comprises gating subsequent candidate matching pulses by model RF.

16. The polysweep engine according to claim 13, wherein the storing of each of the matching pulse sequences associated with its associated known radar model in the computer storage further comprises storing a file on a computer readable storage medium.

17. The polysweep engine according to claim 13, wherein the storing of the residue radar signals for further analysis in the computer storage further comprises storing a file on a computer readable storage medium.

* * * * *